United States Patent [19]

Tuovinen et al.

[11] Patent Number: 5,198,024
[45] Date of Patent: Mar. 30, 1993

[54] PRINTING INK

[75] Inventors: Juhani Tuovinen, Steinfurt, Fed. Rep. of Germany; Markku Sjöstedt, Rajamäki, Finland

[73] Assignee: Yhtyneet Paperitehtaat Oy, Valkeakoski, Finland

[21] Appl. No.: 721,522

[22] PCT Filed: Nov. 13, 1990

[86] PCT No.: PCT/FI90/00270

§ 371 Date: Jul. 12, 1991

§ 102(e) Date: Jul. 12, 1991

[87] PCT Pub. No.: WO91/07471

PCT Pub. Date: May 30, 1991

[30] Foreign Application Priority Data

Nov. 13, 1989 [FI] Finland .................................. 895391

[51] Int. Cl.$^5$ .............................................. C09D 11/06
[52] U.S. Cl. .................................. 106/28 R; 106/27 R
[58] Field of Search ................................ 106/27–29

[56] References Cited

U.S. PATENT DOCUMENTS

| | | | |
|---|---|---|---|
| 2,416,676 | 3/1944 | Bernardi | 106/29 |
| 2,590,654 | 3/1952 | Schmutzler | 260/22 |
| 2,644,760 | 7/1953 | Schroeder | 106/28 |
| 3,937,674 | 2/1976 | Laarkamp | 260/19 |
| 4,056,498 | 11/1977 | Laurito | 260/23.7 |
| 4,391,640 | 7/1983 | Okoshi et al. | 106/29 |
| 4,419,132 | 12/1983 | Moynihan | 106/27 |
| 4,773,932 | 9/1988 | Gamblin | 106/23 |

FOREIGN PATENT DOCUMENTS 0117452 5/1984 European Pat. Off. .

OTHER PUBLICATIONS

Chemical Abstracts, vol. 107, No. 22, 30 Nov. 1987 (Col., OH US), see p. 122, Abstract 200636b, & JP, 6222873 ((Taniguchi Ink Mdg. Col, Ltd.)) 1987.

Primary Examiner—William R. Dixon, Jr.
Assistant Examiner—Margaret Einsmann
Attorney, Agent, or Firm—Pollock, Vande Sande & Priddy

[57] ABSTRACT

A printing ink, especially a printing ink for newsprint, comprises essentially pigment and binder portions. The binder portion consists entirely of a tall oil based agent. The tall oil is chemically processed, e.g. polymerized, esterified, fortified and/or phenolated for bringing it into a form suitable for use as a binder portion and/or a binder component.

6 Claims, No Drawings

PRINTING INK

The present invention relates to a printing ink, particularly to a newsprint ink, essentially including pigment and binder components.

Particularly newsprint covers a considerable part of the current consumption of paper. In terms of national economy it is naturally advisable to use recycled fibre at least partially in the production of newsprint. Recycled fibre is obtained from waste paper subjected to a deinking process for removing previous printing ink and soil. Waste paper is decomposed in the deinking process by a vigorous agitation in the presence of chemicals. The printing ink particles thus removed are separated at the flotation stage of a deinking process. It is obvious that the qualities, particularly whiteness and yield of the recycled fibres obtained from a deinking process are dependent on how effectively the printing ink can be detached from recycled fibres. It is also obvious that the degree of removal of printing ink from waste paper has an effect on the feasibility of the actual deinking process as well as on its enviromental impact.

The currently available types of printing ink, which are applicable to offset, flexo, gravure, silk screen and letterpress printing techniques, are identical in their basic composition. They essentially include pigment and binder components. In most practical cases, the actual binder and a solvent are also separated from each other. In any case, it should be noted that the binder component of the currently employed printing inks includes as its major constituents a resin component as well as a solvent component, particularly a vegetable oil and/or a mineral oil. A characterizing feature in all these printing inks is that the deinking thereof is relatively simple in fresh state. However, especially the recovery of newsprint with all its collection stages e.g. from households to a deinking plant with intermediate storages therebetween leads to the fact that the paper arriving at a deinking plant is in most cases several months old. The performed tests have indicated that all available printing inks, which contain vegetable oils and/or mineral oils, are difficult to deink in aged state. It has been discovered that the problems are due to the chemical changes of a binder as well as to a change in the composition of a printing ink during the aging period caused by the collection process. The following individual reasons can be pointed out:

- Vegetable oils are oxidized and polymerized upon aging and removal of these polymerized products from fibres is difficult,
- part of the mineral oils evaporates during storage and removal of the remaining resinaceous paste from fibre has proved difficult,
- part of the oil component and resin penetrates into the fibrous structure of paper and cannot be removed by deinking.

It should further be noted that, due to the aromatic hydrocarbon chains contained therein, most mineral oils cause health hazards which should be observed in carrying out a deinking process and which, thus, incur costs. Also in terms of a deinking process, the mineral oils are especially troublesome since, in order to fulfil the requirements of environmental protection, the deinking process must include an effective purification of the process waste water, the mineral oils being the most problematic factor in view of waste water purification. It has been surprisingly discovered in this invention that the above problems can be overcome by means of a printing ink which is mainly characterized in that the entire binder component comprises a tall oil based substance. In this context, the term tall oil refers to a side product obtained from pulp cooking and consisting of wood extract. This so-called raw tall oil (CTO) produced as a pulp cooking side product comprises a combination that contains resin acids, fatty acids as well as neutral agents. Various distillation processes can be used for separating from raw tall oil (CTO) a plurality of different resin acid mixtures (TOR) and fatty acid mixtures (TOFA) which contain varying amounts of resin acids, fatty acids and neutral agents. These mixtures can be further processed into a chemical form suitable for use as a printing ink binder and/or binder component e.g. by polymerization, esterification, fortification and/or phenolation or a like chemical process. By using a binder of the invention in a printing ink it is possible to produce high-quality printed matter, particularly for newspaper use. Such printed matter is particularly preferred in view of deinking since the deinking properties thereof remain favourable for a long time. The feasibility of a deinking process is substantially improved as a result of e.g. a high yield and reduced purification requirements for the process wastes whereby, for example, the environmental impacts caused by a deinking process are decreased. Tall oil is an economically advantageous material and its chemical processes are relatively simple to carry out. The binders and/or binder components prepared from tall oil facilitate the production of various types of printing inks, e.g. various types of rheological properties.

The invention will now be described in more detail with reference made to the series of tests disclosed in the following specification Section 1 of the test series discloses a few examples of the production of a binder and/or a binder component. The tall oil compositions contain a varying amount of resin acids (20–83%), fatty acids (4–67%), as well as neutral agents (6–13%) (percent by weight). The amount of tall oil composition from the total amount of the starting agents according to the Examples varied 65–91% (percent by weight). Section 2 of the test series deals with the production of a printing ink. The agents included in section 1 are used to build a binder portion by combining two agents i.e. binder components of examples 1–7 (table 1), the selection being made in consideration of the rheological properties of a binder produced as such a combination. According to whether the printing ink is to be applied to Coldset, Heatset or sheet offset methods, the variation range of e.g. viscosity (dPas) is 20–60 (Coldset), 50–200 (Heatset) or 100–400 (sheet offset) and the respective readings for tackiness are 60–100, 80–200 and 100–220. The ink components show in table 2 are particularly suitable for offset technique. A skilled person has no trouble at all in combining e.g. examples 1–7 of table 1 also otherwise, e.g. a plurality of binder components, which is naturally a way of producing printing inks suitable also for other printing techniques. In section 3 of the test series, the superiority of a tall oil based printing ink of the invention in a deinking process is verified by comparing with soya and mineral inks (commercial types).

1. PREPARATION OF BINDER AND/OR BINDER COMPONENT

Example 1

Into a mixing container provided with a nitrogen supply tube is charged 88 parts of a tall oil mixture which contains 20% of resin acids, 74% of fatty acids as well as 6% of neutral agents and temperature is slowly raised to 180 centigrades. At this temperature, 12 parts of monoethylene glycol is added.

The addition is followed by raising the temperature during three hours to 260 centigrades. The batch is allowed to react at this temperature until the acid value is less than 30.

The resulting product is removed from container and acid value (HL) as well as viscosity ($\eta$) at 25 centigrades are determined.

Examples 2-5

Procedure is carried out as in example 1 by varying the amounts of starting agents as shown in table 1.

Example 6

Procedure is carried out as in example 1 but the employed tall oil mixture contains 55% of resin acids, 35% of fatty acids and 9.5% of neutral agents.

Example 7

Into a mixing container provided with a nitrogen supply tube is batched at the temperature of 160 centigrades 81.0 parts of tall resin which contains 83% of resin acids, 4% of fatty acids and 13% of neutral agents. This is followed by adding 1.6 parts of glycerol.

Over five hours the tall resin is admixed with 6.2 parts of formaline and 4 parts of diphenylol propane. This is followed by adding 6.3 parts of glycerol and 0.009 parts of magnesia. Temperature is slowly raised to 255 centigrades and the batch is allowed to react at this temperature until the acid number has dropped to below 30.

The obtained product is removed from the container and the end product is determined for acid number (HL) as well as melting point (Sp).

Table 1 indicates that the binder components prepared according to examples 1-7 are capable of covering an extensive range of properties, so there will be a plurality of options available for a skilled person to select the rheological, e.g. viscoelastic properties as well as the lithographic properties of a printing ink regarding the desired functional characteristics of a printing ink.

TABLE 1

| Ex- ample | Starting agent amounts (%) | ACID NUM- BER AC | VIS- COSITY 25° C. /mPas | MELTING POINT SP/°C. (capillary method) |
|---|---|---|---|---|
| 1 | Tall oil mixture 88% monoethyleneglycol 12% | 24 | 115 | |
| 2 | Tall oil mixture of Example 1 91% glycerol 9% | 13 | 1070 | |
| 3 | Tall oil mixture of Example 1 87% Tri-methylolpropane 13% | 30 | 750 | |
| 4 | Tall oil mixture of Example 1 78% fumaric acid 5.8% maleic acid anhydride 2.0% trimethylolprepane 13.6% glycerol 0.6% | 30 | 18700 | |
| 5 | Tall oil mixture of Example 1 79% mono-pentaerithrytol 21% | 10 | 5000 | |
| 6 | Tall oil mixture 65% phtalic acid an-hydride 15% mono-ethyleneglycol 17.5% glycerol 2.5% | 7 | 29000 | |
| 7 | Tall resin 91% glycerol 8.9% formaldehyde 6.1% diphenylol propane 4% magnesium oxide 0.009% | 26 | | 130 |

2. PREPARATION OF PRINTING INK

The amounts of materials as set forth in the accompanying table 2 are mixed and dispersed by means of three-roll or bead-mill grinders until the required grinding fineness is achieved.

TABLE 2A

| | Yellow | Magenta | Cyan | Black |
|---|---|---|---|---|
| Antioxidant | 0.1 | 0.1 | 0.1 | 0.1 |
| Binder component 1 | 58.0 | 35.0 | 56.0 | 42.0 |
| Binder component 2 | 23.9 | 23.9 | 24.9 | 36.9 |
| Binder component 3 | | 18.0 | | |
| CI Pigm. Yellow 13 | 10.0 | | | |
| CI Pigm. Red 57:1 | | 15.0 | | |
| CI Pigm. Blue 15:3 | | | 13.0 | |
| CI Pigm. Black 7 | | | | 21.0 |
| CI Pigm. White 21 | 8.0 | 8.0 | 6.0 | |

(CI = colour index)

The employed antioxidant is e.g. 2,6-ditentiary-butyl-4-methylphenol.

If binder component 1 is the agent according to example 6 of table 1, binder component 2 is the agent according to example 1 of table 1 and binder component 3 is the agent according to example 4, the inks will be provided with rheological properties shown in the following table 3:

TABLE 3A

| | Yellow | Magenta | Cyan | Black |
|---|---|---|---|---|
| Viscosity (dPas) | 26 | 30 | 25 | 28 |
| Tack | 85 | 110 | 81 | 98 |

Characteristic values in table 3 are determined as follows:

| Viscosity | Laray-viscosimeter, measuring temperature 25° C. |
|---|---|
| Tack | Tack-O-Scope tackmeter, measuring temperature 25° C., rate 100 m/min and ink film thickness 5 μm |

Binder components 1 and 2 can be replaced with the agents according to examples 1-6 of table 1 for varying the rheological or lithographic properties of the ink.

TABLE 2B

| | Yellow 2 | Magenta 2 | Cyan 2 | Black 2 | Black 3 |
|---|---|---|---|---|---|
| Antioxidant | 0.1 | 0.1 | 0.1 | 0.1 | 0.1 |
| Binder component 1 | 57.9 | 53.9 | 53.9 | 45.0 | |

TABLE 2B-continued

|  | Yellow 2 | Magenta 2 | Cyan 2 | Black 2 | Black 3 |
|---|---|---|---|---|---|
| Binder component 2 | 26.0 | 25.0 | 27.0 | 36.9 | 20.0 |
| Binder component 3 |  |  |  |  | 57.9 |
| CI Pigm. Yellow | 10.0 |  |  |  |  |
| Red |  | 15.0 |  |  |  |
| Blue |  |  | 13.0 |  |  |
| Black |  |  |  | 18.0 | 22.0 |
| White 21 | 6.0 | 6.0 | 6.0 |  |  |

Binder component 1 is prepared as follows:

30 parts of the agent according to example 7 of table 1 is dissolved in 70 parts of the agent according to example 3 of table 1 at the temperature of 180 centigrades over 30 minutes under agitation.

Binder component 2 is the agent according to example 2 of table 1 and binder component 3 is the agent according to example 5 of table 1.

By using the above components, the inks are provided with the rheological properties shown in table 3:

TABLE 3B

| A | Yellow 2 | Magenta 2 | Cyan 2 | Black 2 | Black 3 |
|---|---|---|---|---|---|
| Viscosity (dPas) | 22.0 | 26.0 | 22.0 | 24.0 | 19.0 |
| Tack | 88 | 98 | 85 | 103 | 95 |

Proportions of the components in the formulation depend on a viscosity value pursued for the ink to be prepared.

Particularly for using the agent according to example 7 of table 1 in the formulations of table 2 as binder component 1, the procedure is as follows: 35 parts of the agent according to example 7 of table 1 is dissolved in 65 parts of the agent according to example 1 of table 1 at the temperature of 180 centigrades under agitation over 30 minutes. Cooling. The present mixture can be used to replace the agent according to example 6 of table 1 at the ratio 1:1.

3. DEINKING TESTS

An object in the following tests has been to find out the applicability of various ink types to a deinking process as well as to compare their properties with each other Tests have been carried out in a test laboratory by using the Voith laboratory flotation cell, the size of a test sample being 200 g. The measuring results, disclosed hereinbelow, are average values of several measurements effected on a plurality of test samples.

3.1 SAMPLES

Selected for the tests were mineral, soya as well as tall oil based newspaper inks which were used in four-colour newspaper samples made in printing plants with production printing machines. The samples matched each other in printing quality. The samples were aged in a test laboratory protected from light. The effect of aging of a printing ink upon deinkability was studied on 12 weeks old samples. Samples at the age of 1 week were used as reference.

TABLE 4

| Denotation used | Content | Trade name* |
|---|---|---|
| MINER | Mineral ink | Ink produced by ROTO Oy |
| SOYA | Soya ink | Ink produced by Oy Magenta Ab |
| TALL | Tall oil ink | Printing ink shown in tables 2a–2c containing as a whole a tall oil based binder |

*or other specification

3.2 RESULTS

Definitions based on laboratory sheets

3.2.1 Reject percent

TABLE 5

|  | age weeks | |
|---|---|---|
|  | 1 | 12 |
| MINER | 1,6 | over 20 |
| SOYA | 4,0 | over 20 |
| TALL | 1,5 | 1,7 |

3.2.2 Whiteness

TABLE 6

|  |  | age weeks | |
|---|---|---|---|
|  |  | 1 | 12 |
| MINER | pulped | 52.7 | 38.6 |
| MINER | flotated | 54.4 | 44.1 |
| SOYA | pulped | 44.8 | 41.7 |
| SOYA | flotated | 51.4 | 44.9 |
| TALL | pulped | 57.0 | 53.9 |
| TALL | flotated | 57.9 | 54.11 |

3.2.3 Whiteness ratio

TABLE 7

| Change of whiteness flotated/pulped | | |
|---|---|---|
|  | age weeks | |
|  | 1 | 12 |
| MINER | 1.7 | 5.5 |
| SOYA | 6.6 | 3.2 |
| TALL | 0.9 | 0.25 |

3.2.4 Soil spots

Soil spots are measured from flotated samples. Table 8 indicates the proportion of soil spots about an image area and table 9 indicates the size distribution percent of soil spots (index 1 and 12 refer to the age of a sample in weeks)

TABLE 8

|  | age weeks | |
|---|---|---|
|  | 1 | 12 |
| MINER | 0.22 | 0.45 |
| SOYA | 0.48 | 0.49 |
| TALL | 0.12 | 0.20 |

TABLE 9

| μm | MINER1 | MINER12 | SOYA1 | SOYA12 | TALL1 | TALL12 |
|---|---|---|---|---|---|---|
| <26 | 35.2 | 28.7 | 48.6 | 31.6 | 49.7 | 50 |
| 52 | 15.5 | 16.9 | 18.4 | 21.2 | 16.8 | 15.7 |

TABLE 9-continued

| μm | MINER1 | MINER12 | SOYA1 | SOYA12 | TALL1 | TALL12 |
|---|---|---|---|---|---|---|
| 79 | 12 | 12.2 | 4.8 | 8.9 | 6.6 | 6.0 |
| 105 | 8.0 | 8.0 | 7.3 | 8.1 | 4.2 | 9.0 |
| 131 | 3.3 | 4.5 | 3.8 | 5.7 | 3.6 | 2.0 |
| >158 | 26.4 | 30.0 | 17.1 | 28.5 | 19.2 | 17.0 |

3.3 CONCLUSIONS ABOUT THE DEINKING TESTS

Fresh printing ink detaches from fibres in pulping. Thus, the amount of reject remains small and a high degree of whiteness is achieved in flotation. A change of whiteness remains slight since printing ink particles are flushed away in a sheet mould along with water. The aged soya ink resembles mineral ink in particle size distribution; the proportion of small soil spots is reduced. Large printing ink particles are removed in flotation more readily than small ones. If a flotated sample contains plenty of large particles, those are generally attached to fibres. There has been no change due to aging in the particle size distribution of a tall oil based printing ink. This can lead to a conclusion that the printing ink is not oxidized or the printing ink does not stick to the fibre even upon oxidation.

3.3.1 Pulping

Fresh mineral as well as tall oil ink samples released the printing ink in pulping process. The released printing ink formed flocs in a digestion vessel on the surface of stock pulp. In a soya oil based sample there occurred no flocculation of printing ink particles. The aged tall oil ink released well from the fibres and formed flocs just like in fresh state. The aged mineral as well as soya oil inks did no release in pulping but some ink remained stuck to the fibre.

3.3.2 Flotation

Fresh printing inks behaved in flotation in identical manner, the amount of froth, bubble size and proportion of reject remained the same throughout the flotation process. The froth of vegetable oil based inks felt more "oily" but that did not seem to affect the formation of froth or the removal of printing ink. In aged samples there were detectable differences between ink types. The aged soya as well as mineral ink remained stuck to the fibres. The abundance of reject is probably due to this, since fibre rised in a flotation vessel to the surface of stock pulp as a thick layer. The fibre layer prevented the formation of froth, whereby the removal of small detached ink particles into the reject became more difficult. The tall oil ink was not stuck to the fibres so the above fibre layer was not formed and the formation of froth was normal.

We claim:

1. A printing ink for newsprint, comprising pigment and binder portions, wherein the entire binder portion for effective de-inking and pulping of said newsprint consists of at least two tall oil based agents which are formed by chemical processing of tall oil by at least one process selected from the group consisting of polymerization, esterification, fortification, phenolation and mixtures thereof to provide tall oil based agents for said binder portion; wherein said at least two tall oil based agents have different viscoelastic properties, the characteristics of the printing ink being produced by a proper selection of said at least two tall oil based agents and a mixing ratio in order to achieve suitable printing properties together with effective de-inking and pulping properties.

2. A printing ink as set forth in claim 1, characterized in that the at least two tall oil agents used are obtained by chemical processing of a tall oil that comprises 20-83% of resin acids and 4-67% of fatty acids, and optionally a remaining portion consisting of neutral agents.

3. A printing ink as in claim 1 which has been esterified by using momoethylene glycol, trimethylol propane, pentaerithrytol or mixtures thereof.

4. A printing ink as in claim 1 which has been fortified using fumaric acid, maleic acid anhydride or mixtures thereof.

5. A printing ink as in claim 1 which has been phenolated using diphenylol propane.

6. A printing ink as in claim 1 which has been esterified using phthalic acid anhydride as an additive.

* * * * *